J. H. AND A. E. GILMAN.
CORN SHELLER.
APPLICATION FILED MAR. 11, 1916.

1,322,303.

Patented Nov. 18, 1919.
8 SHEETS—SHEET 1.

Witnesses:
W. F. Kilroy
Harry R. L. White.

Inventors:
John H. and Albert E. Gilman,
By John Howard McElroy,
their Atty.

J. H. AND A. E. GILMAN.
CORN SHELLER.
APPLICATION FILED MAR. 11, 1916.

1,322,303.

Patented Nov. 18, 1919.
8 SHEETS—SHEET 3.

Witnesses:
W. P. Kilroy
Harry R. L. White

Inventors:
John H. Gilman
Albert E. Gilman
By John Howard McElroy
their Atty.

J. H. AND A. E. GILMAN.
CORN SHELLER.
APPLICATION FILED MAR. 11, 1916.

1,322,303. Patented Nov. 18, 1919.
8 SHEETS—SHEET 5.

Fig. 5.

Witnesses: 
W. F. Kilroy
Harry R. L. White

Inventors:
John H. and Albert E. Gilman,
By John Howard McElroy,
their Atty.

J. H. AND A. E. GILMAN.
CORN SHELLER.
APPLICATION FILED MAR. 11, 1916.

1,322,303.

Patented Nov. 18, 1919.
8 SHEETS—SHEET 8.

UNITED STATES PATENT OFFICE.

JOHN H. GILMAN AND ALBERT E. GILMAN, OF OTTAWA, ILLINOIS, ASSIGNORS TO KING & HAMILTON COMPANY, OF OTTAWA, ILLINOIS, A CORPORATION OF ILLINOIS.

CORN-SHELLER.

1,322,303.

Specification of Letters Patent.

Patented Nov. 18, 1919.

Application filed March 11, 1916. Serial No. 83,477.

*To all whom it may concern:*

Be it known that we, JOHN H. GILMAN and ALBERT E. GILMAN, citizens of the United States, and residents of Ottawa, in the county of La Salle and State of Illinois, have invented certain new and useful Improvements in Corn-Shellers, of which the following is a full, clear, and exact specification.

Our invention is concerned with corn shellers, and is designed to produce a device of the class described that shall accomplish all that has been done by similar shellers heretofore, and that shall be smaller and more compact, and simpler in its construction.

To these ends, our invention is embodied in certain novel constructions and combinations of elements, all of which will be more fully described in the body of the specification, and particularly pointed out in the annexed claims.

To illustrate our invention, we have annexed hereto eight sheets of drawings, in which the same reference characters are used to designate identical parts in all the figures, of which,—

Figs. 2 and 8 are on the same scale, while Figs. 3 to 7, inclusive, are on a larger scale.

Figure 1:
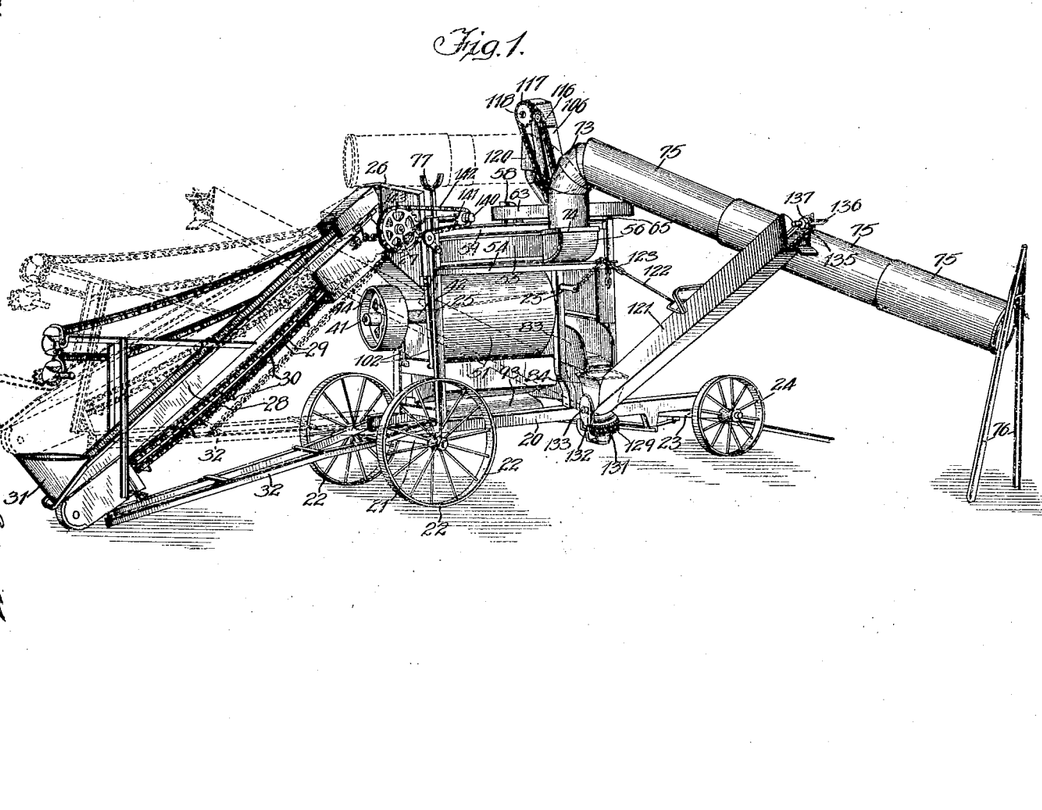
Figure 1 is a perspective view of the machine with the parts in position for use in full lines, and with the parts ready for transportation in dotted lines.

Referring first to Fig. 1, the truck frame 20 will be seen to be mounted at the forward or receiving end directly upon the axle 21 supported by the large truck wheels 22, while the rear or discharging end of the truck frame is likewise directly supported on the axle 23 of the smaller truck wheels 24, with the result that the entire mechanism is inclined slightly downward from the front to the rear, this being advantageous in the feed of the corn through the shelling concave, and of the shelled corn along the length of the screens and through the customary conveyer, which also extends longitudinally of the machine. The truck supports the general framework 25 of the machine, which is preferably made up of angle irons of the proper size and dimensions to support the various elements. At the upper receiving end is the receiving hopper 26, which is preferably made of sheet metal and of any customary construction, and it has pivoted therein, preferably on the driving shaft 27, the upper end of the feed conveyer trough 28. This trough may be of any desired construction, and has one or more endless feed chains 29 connected by slats 30, so that the ear corn deposited in the hopper 31 by the customary drag (not shown) will be elevated and discharged in the receiving hopper 26. A supporting frame 32 is pivoted at one end to the bars 20, and is adapted to have its other end engaged with suitable projections on the lower portion of the trough 28 to hold the latter elevated from the ground in the dotted-line position shown in Fig. 1 by chains applied to the frame 32 when it is desired to transport the machine. The driving connections for the feed elevator will be explained subsequently.

Figure 2:
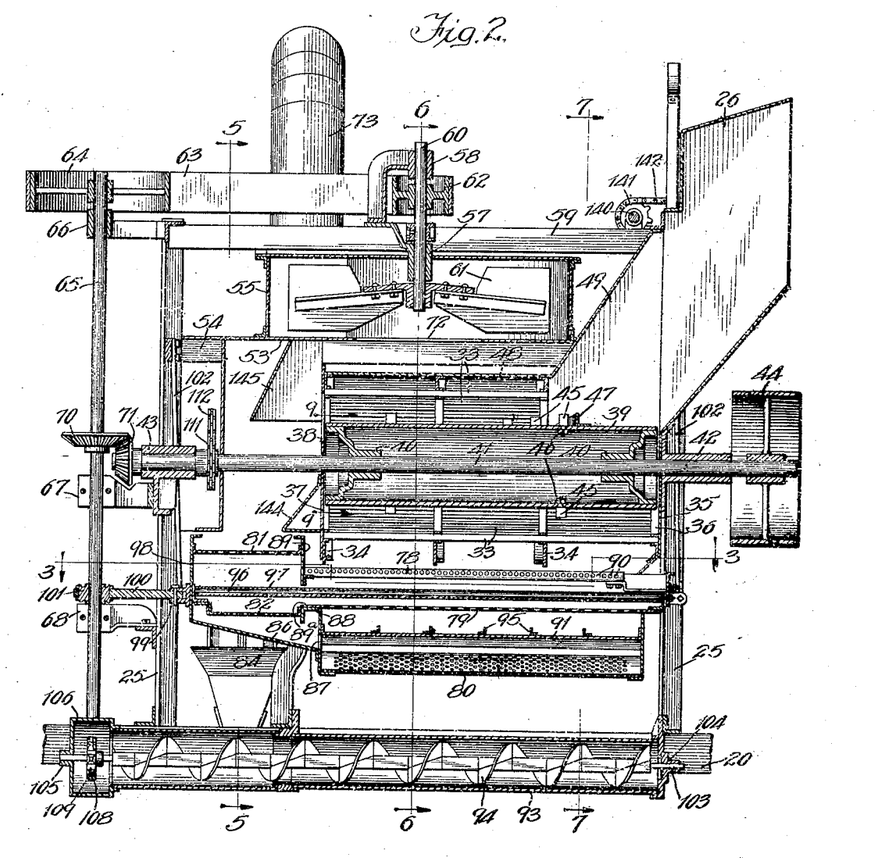
Fig. 2 is a central longitudinal section on the line 2—2 of Fig. 4.
Figure 5:
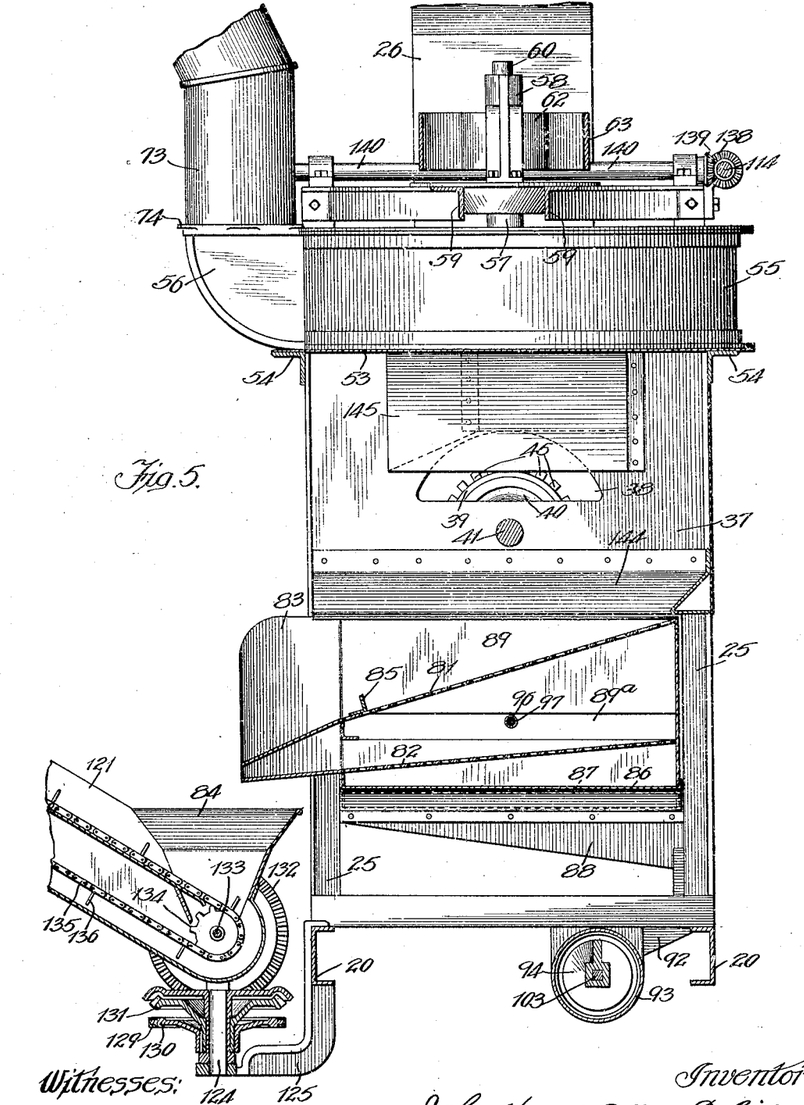
Figs. 5, 6 and 7 are vertical cross sections on the lines 5—5, 6—6 and 7—7, respectively, of Fig. 2.
Figure 6:
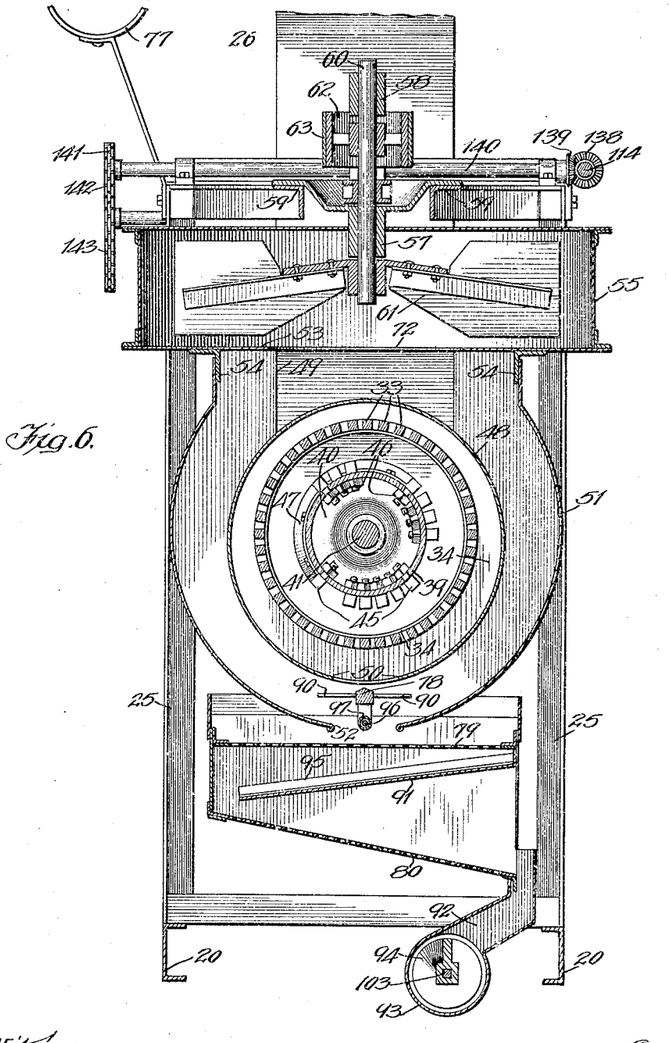
Figure 7:
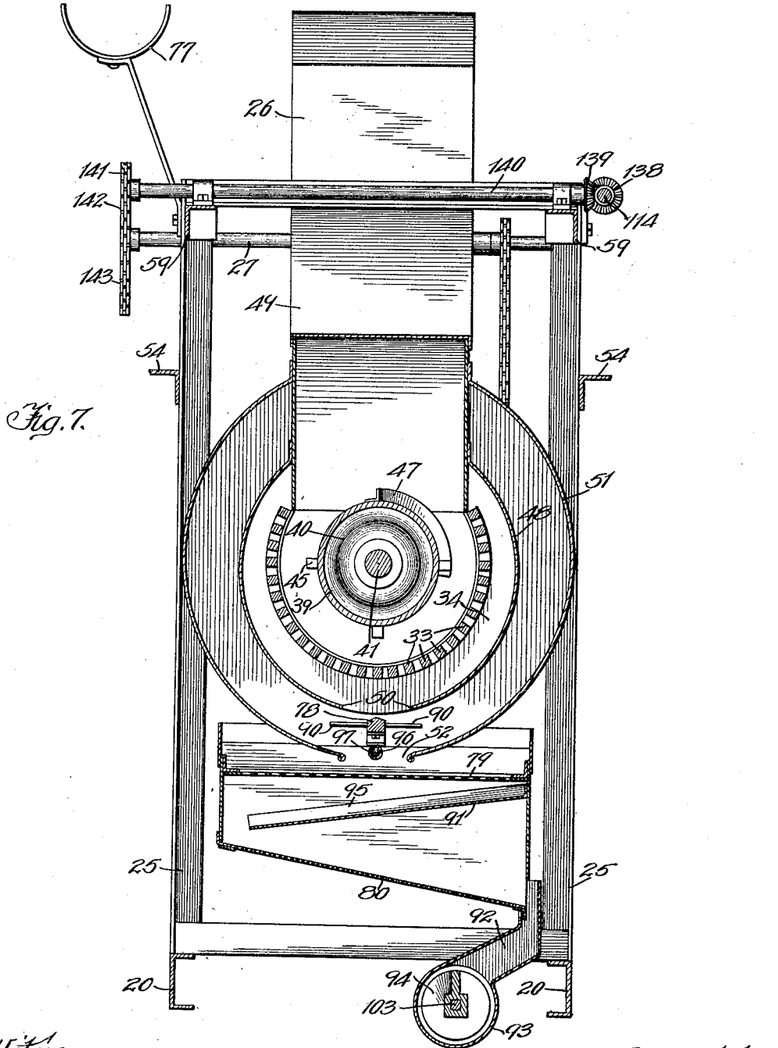

Referring now to Fig. 2, the ear corn fed into the receiving hopper 26 falls into the receiving end of the shelling concave, which, as best seen in Figs. 2, 6 and 7, is made up of a series of parallel bars 33 arranged in a circle and supported by the three circular castings 34, which have suitable perforations to receive and support the aforesaid bars 33. The bars 33 constituting the upper half of the concave are shorter than those constituting the lower half, in order to form the receiving end of the concave and permit the hopper 26 being attached thereto. The receiving end of the shelling concave is closed, so far as it is closed, by the plate 35 secured to the semi-circular casting 36, corresponding in its function to the castings 34. The rear end of the concave is closed by the metal plate 37, best seen in Fig. 5, which has the segmental aperture 38 opening into the upper portion of the concave to permit the escape therefrom of the cobs after the corn has been shelled therefrom.

Figure 10:
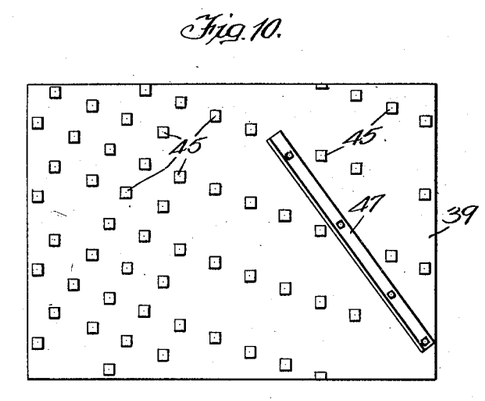
Fig. 10 (Sheet 3) is an extended view of the surface of the shelling cylinder.

The shelling cylinder 39 is preferably formed of large steel tubing secured on the heads 40, in turn secured on the main driving shaft 41 journaled in suitable bearings 42 and 43 supported by the framework at the receiving and discharging ends of the machine. The machine is preferably driven by power applied to the large belt wheel 44 secured on the shaft 41 at the receiving end of the machine. The shelling cylinder is furnished with studs 45, which are preferably formed of hardened metal, with their reduced inner ends extending through suitable apertures in the cylinder 39, and secured in place by the nuts 46 threaded thereon. The shelling studs 45 are arranged in helical rows, as best shown in the extended view seen in Fig. 10, and may be reinforced by the angular feeding-bar 47 bolted thereon. There are preferably four of these helical rows of studs extending the entire length of the cylinder, and one feature of our invention consists in the employment between these four main rows of four shorter rows at the discharge end, as we have found by experiment that the sheller operates with much greater capacity for the same length of cylinder if the number of teeth at the discharge end be increased as compared with the number at the receiving end, this resulting from the fact that the corn, as it reaches the discharging end, has mainly been shelled, and the greater number of teeth in the same angular space operates more effectively on the partly shelled corn than does the fewer number, while the greater number of teeth would be impractical in operating on the corn at the receiving end, where it has not been shelled at all.

Referring to Figs. 2, 6 and 7, it will be seen that the shelling concave is surrounded by the sheet-metal cylinder 48 extending between the plates 35 and 37, except in so far as it is interrupted at the receiving end by the connection therewith of the portion 49 of the receiving hopper which is within the framework of the machine. It is also provided with the slot 50 extending the length thereof at the bottom to permit the shelled corn to escape from this cylinder-casing. It will be noted that this casing 48 is set eccentrically of the circle formed by the bars 33 of the shelling concave, the castings 34 being designed with this end in view, so that the size of the passage outside the shelling concave increases from the top to the discharge opening 50 in the bottom, as it will be obvious that the amount of corn escaping from the concave through the slots between the bars 33 increases from the top to the bottom. It also prevents possible clogging by silks and husks. Surrounding the casing 48 is another sheet-metal casing 51, which also has a longitudinal slot 52 in the bottom portion thereof registering with the slot 50 to permit the escape of the shelled corn, and the top of this casing is formed by the flat plate 53 secured on the tops of the longitudinal angle irons 54 of the framework of the casing. The upper edges of the curved sides of the casing 51 are likewise secured to these same angle irons, to the rear of the inner portion 49 of the receiving hopper. In the forward portion, the upper edges of the sides of the casing 51 are secured to the sides of the portion 49 of the receiving hopper 26, as seen in Fig. 7. Secured on the top of the plate 53 is the suction-fan casing 55, which is circular in its general outline, except for the extension 56 thereof, through which the discharge occurs. Supported in suitable bearings 57 and 58, suitably supported from the longitudinal bars 59 forming the top of the main frame of the machine, is the shaft 60 of the suction fan 61, which is of any desired construction, and secured on the shaft 60 between the bearings is the belt-pulley 62, which is driven at a high rate of speed by the belt 63 from the belt-wheel 64 secured on the top of the vertical shaft 65 journaled in the four bearings 66, 67, 68 and 69 extending outward from the discharge end of the main frame. This vertical shaft 65 has secured thereon the bevel gear wheel 70 meshing with the bevel gear wheel 71 secured on the discharging end of the main driving shaft 41, so that as the shelling cylinder is operated the suction fan 61 will be driven at a high speed to suck up the silks and husks, and any other chaff, from the separating chute. The plate 53 has the circular opening 72 in the bottom thereof concentric with the axis of the fan 61, and the material sucked up thereby is forced out through the extension 56 into the elbow 73, which is connected to the top of the extension 56 by the horizontal joint 74, so that the elbow can be turned upon a vertical axis to direct the husks to any desired quarter. The elbow 73 has pivoted on the upper horizontal end thereof the innermost one of a plurality of telescoping pipe sections 75, which may be of any desired construction, but which are preferably of the character shown in the Gilman Patent No. 883,109, dated March 24, 1908. When the sheller is in use, these telescoping sections are extended, as shown in full lines in Fig. 1, and supported at their outer ends by a suitable standard 76 to deliver the husks wherever it is desired to stack the same. When the machine is to be transported, the sections 75 are telescoped and the elbow 73 swung around to bring the sections to the dotted-line position shown in Fig. 1, where they rest on the supporting yoke 77 secured to and extending upward from the framework at one side of the receiving end of the machine.

The separating shoe contains many novel features of construction, and will be seen to have three screens, 78, 79 and 80, directly beneath the shelling concave, for screening the shelled corn, while at the discharge end of the machine it has two transverse screens 81 and 82 for screening the corn from the cobs which are discharged on the screen 81. As best seen in Fig. 5, the screens 81 and 82 are supported in what is in effect a transverse trough 83 secured at the discharge end of the shoe, and the screen 81 on which the cobs are discharged is inclined somewhat sharply to allow the cobs to descend therefrom by gravity into the hopper 84 of the cob conveyer. To prevent shelled corn from possibly escaping off of this screen with the cobs, we place the bar 85, preferably constructed of a piece of angle iron, across the screen 81 toward the discharge end. Below the screen 81 is the finer screen 82, and shelled corn passing these screens falls onto the inclined bottom 86 of the cob extension, and thence passes through the longitudinal aperture 87 in the end 88 of the main body of the shoe onto the bottom screen 80 of the shoe proper.

Figure 3:
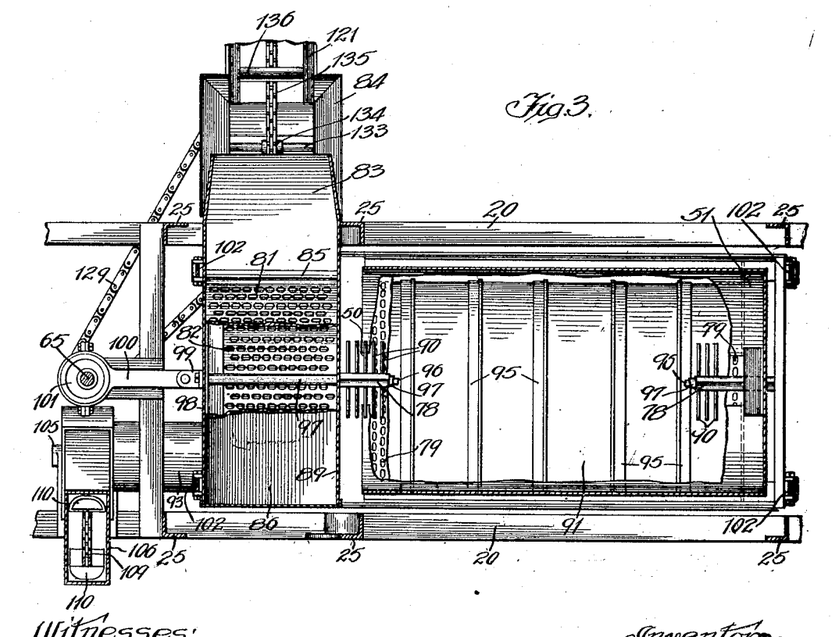
Fig. 3 is a horizontal section substantially on the line 3—3 of Fig. 2.

The screen 78, interposed between the inner side 89 of the chute 83 and the other end of the shoe, is preferably constructed of a long wooden bar having the teeth 90 extending therethrough, as best seen in Fig. 3. This forms a coarse comb-like screen on which the ends of the cobs, if any are broken off, are arrested, so that the current of air rushing up in the passages between the two cylinders will draw said light ends of the cobs upward and discharge them into the suction fan, whence they are delivered with the husks. The screen 79 is of the customary construction to permit the passage of shelled corn, and is substantially level, except for the inclination along the length of the machine pointed out at the beginning of the description, and serving to distribute the grain more uniformly along its length, as it will be understood that there is more grain discharged from the receiving end of the concave than from the discharge end. If any shelled grain falls over the end of the screen 79, in so falling it passes through an elongated opening 89ᵃ formed in the inner wall of the chute 83 and falls onto the screen 82, which is slightly lower than the screen 79, and after passing through the screen 82, it is carried back by the inclined plate 86 onto the screen 80. As best seen in Figs. 3 and 6, the screens 79 and 80 have interposed between them an inclined plate 91, which serves the purpose of compelling the shelled grain passing through the screen 79 to be delivered to the higher end of the screen 80, so that the grain must roll down the entire incline of the screen 80 before it can discharge into the passage 92 leading to the cylinder 93, in which the screw-conveyer 94 is mounted. The passage of the grain over this screen 80 insures all the half grains or small grains being screened out; but if it is desired to preserve this broken grain, the screen 80, which is removable, can be taken out and replaced by an imperforate plate. To distribute the grain from the screen 79 more uniformly along the entire length of the screen 80, we employ the ribs 95 extending transversely of the plate 91, as best seen in Fig. 3. The two ends of the shoe are connected by the rod 96 passing through the tube 97, the parts being thus braced and stiffened, and the outer side 98 of the cob trough has the ears 99, between which is pivoted the eccentric strap 100 coöperating with the eccentric 101 secured on the shaft 65, so that the shoe is constantly reciprocated, the shoe being suspended by the four bars 102 connected to the four corners thereof and secured at their upper ends to suitable portions of the framework.

Figure 4:
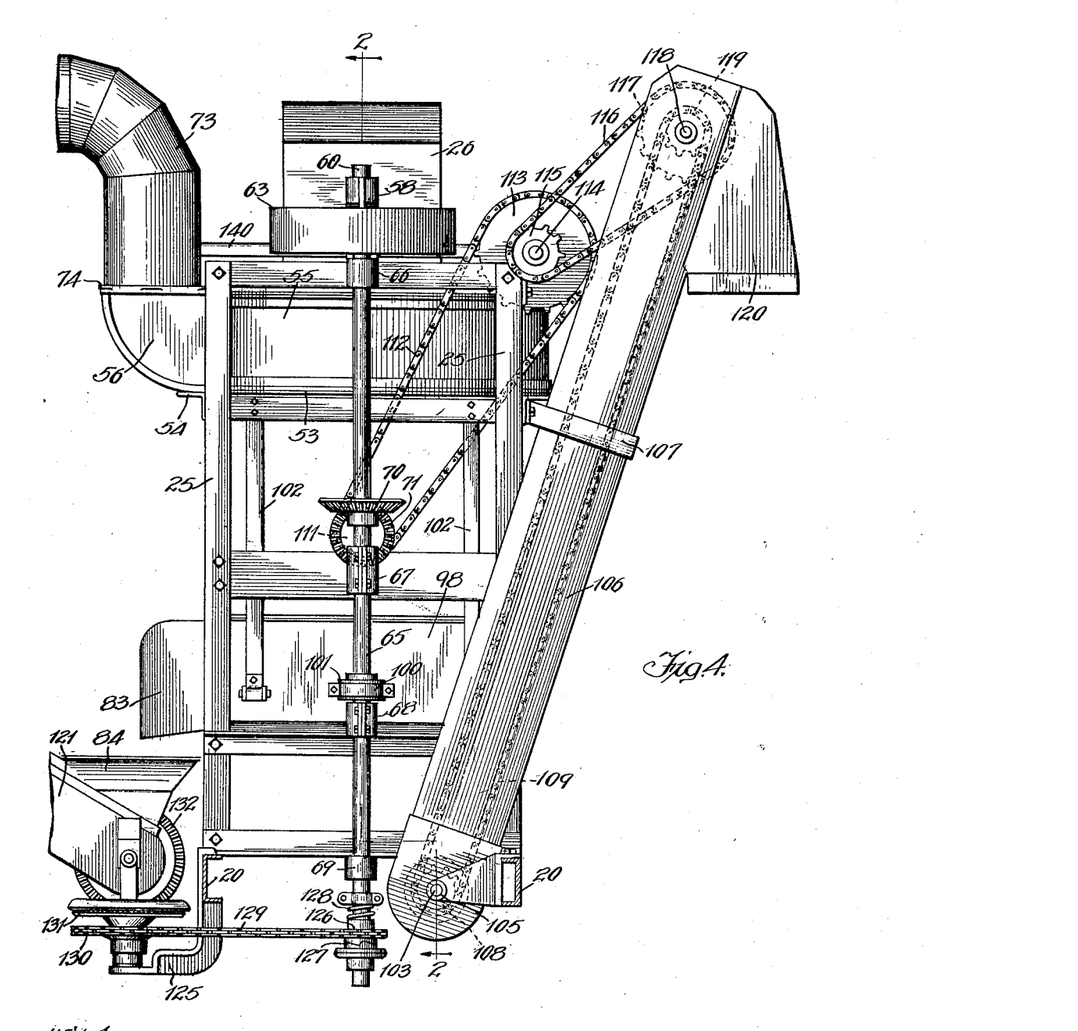
Fig. 4 is an end elevation of the discharging end.

The shaft 103 of the shelled-corn conveyer 94 is journaled at the receiving end in the bearing 104, while its other end is journaled in a bearing 105 in the lower end of the shelled-corn-conveyer casing 106, which, as seen in Figs. 2 and 4, is secured to the discharge end of the shelled-corn-conveyer trough 93, and extends diagonally upward from the discharge end of the sheller, being supported by the loop bracket 107, shown in Fig. 4. The shaft 103 has the sprocket wheel 108 secured thereon in the center of the boot, and a sprocket chain 109 carrying a series of cups 110 furnishes the elevating mechanism for the shelled corn. Secured on the shaft 41 just inside the bearing 43 is a sprocket wheel 111 connected by a sprocket chain 112 with a sprocket wheel 113 (see Fig. 4) secured on a horizontal shaft 114 journaled in bearings supported on the adjacent corners of the framework. A sprocket pinion 115 secured on the same shaft is connected by the sprocket chain 116 with the sprocket wheel 117 secured on the shaft 118 journaled in the upper end of the casing 106, and provided within said casing with the sprocket wheel 119, over which the sprocket chain 109 travels; and by the gearing thus described, it will be obvious that the shelled-corn conveyer is rotated to carry the shelled corn to the elevator, by which it is raised to be delivered through the discharge chute 120.

The cob-elevator casing 121 is supported at any desired elevation by the rod 122 and the chain 123 coöperating with a suitable catch on the framework, as seen in Fig. 1. The lower end of the casing and the attached hopper 84 are pivotally mounted on the vertical shaft 124, which is rigidly secured to the bearing bracket 125 extending downwardly and outwardly from the adjacent bar 20 of the main frame. A sprocket pinion 126 secured on the lower end of the shaft 65 by a clutch 127 normally held in engagement by the helically-coiled expanding spring 128, through the medium of the sprocket chain 129, drives the sprocket wheel 130 which is secured to the hub of the bevel gear wheel 131 which revolves on the upright shaft 124. The bevel gear wheel 131 meshes with a bevel gear wheel 132 secured on the outer end of the shaft 133 journaled in suitable bearings carried by the casing 121. A sprocket wheel 134 secured on the shaft inside the casing carries a sprocket chain 135 having the cob-elevating slats 136 secured thereon at suitable intervals and running over a similar sprocket wheel 137 journaled in the top of the cob-elevator casing. With the construction shown and described, it will be obvious that the cob elevator will operate in any angular position to which it may be adjusted, and when the machine is to be transported, it can be swung around to one side against the side of the main frame of the machine, as indicated in dotted lines in Fig. 1.

The shaft 114 has secured thereon, toward its forward end, a miter gear 138 which meshes with the miter gear 139 secured on the adjacent end of the transverse shaft 140 journaled in suitable bearings secured on the top of the framework of the machine. At the other end of the shaft 140, beyond the framework of the machine, is secured a sprocket pinion 141 that is connected by the sprocket chain 142 with a sprocket wheel 143 secured on the shaft 27 of the feeding elevator 28.

Figure 8:
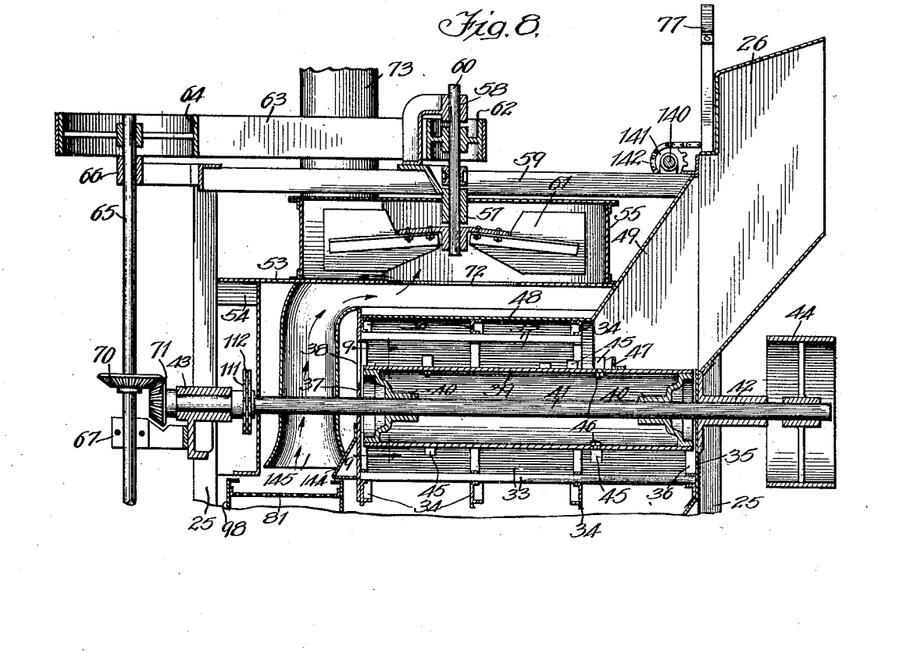
Fig. 8 is a view similar to the upper portion of Fig. 2, but showing a modified arrangement of the hood to conduct the husks to the suction fan.
Figure 9:
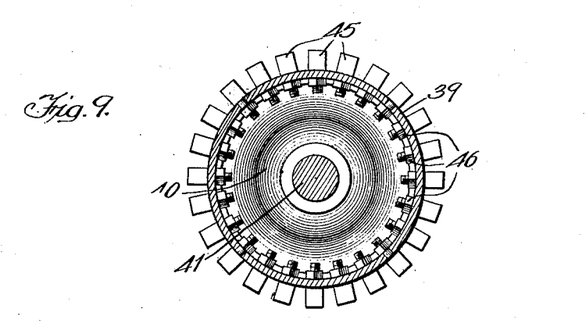
Fig. 9 is a section through the shelling cylinder on the line 9—9 of Fig. 2 or Fig. 8, but on an enlarged scale.

Referring now especially to Figs. 2 and 8, it will be understood that the corn cobs escaping from the aperture 38 sometimes carry with them husks that have been left on the corn when it was shucked, and which are loosened from the cobs in the shelling operation. To insure the cobs falling on the screen 81, we secure to the wall 37 beneath the shaft 41 an inclined plate 144. To insure the husks thus delivered from the concave being carried to the aperture 72 opening into the suction-fan casing, we preferably employ a hood 145, which may terminate above the shaft 41, as shown in Fig. 2, or which may be extended down almost to the surface of the screen 81, as seen in the modified form shown in Fig. 8. This hood opens at its upper end into the top of the passage formed between the two cylindrical casings 48 and 51.

The operation of the foregoing sheller in all its details will be readily apparent from the foregoing description, and as power is applied to the belt wheel 44, all the gearing is set in motion, and corn delivered to the feeding elevator will carry it up and dump it into the hopper 26, whence it passes into the shelling concave, and is there separated into shelled corn, cobs and husks. The shelled corn falls through the various screens to the worm conveyer, and is carried thence by the shelled-corn elevator. The cobs falling on the screen 81, pass down the cob chute and are delivered to the hopper 84 of the cob conveyer, by which they are carried up to be discharged in the wagon receiving them. The husks, silk and chaff are drawn up through the passages mentioned by the suction fan 61, which blows them out through the wind stacker to the desired location.

While we have shown and described our invention as embodied in the forms which we at present consider best adapted to carry out its purposes, it will be understood that it is capable of modifications, and that we do not desire to be limited in the interpretation of the following claims except as may be necessitated by the state of the prior art.

What we claim as new, and desire to secure by Letters Patent of the United States, is:

1. In a sheller, the combination with a shelling concave, of a shelling cylinder mounted to rotate therein, a casing surrounding the concave and open at the bottom beneath it, a suction-fan casing above the first-mentioned casing, a fan in said casing, a third casing surrounding the first and also open at the bottom, and forming an air passage from the bottom of the first casing to the receiving opening in the fan casing, and means to rotate the cylinder and fan.

2. In a sheller, the combination with a shelling concave, of a shelling cylinder mounted to rotate therein, a cylindrical casing surrounding the concave, open at the bottom beneath it, and set eccentrically thereof so that the space between the outer side of the concave and the inside of the casing increases from the top to the bottom, a suction-fan casing above the first casing, a fan in said casing, a third casing surrounding the first and also open at the bottom, and forming an air passage from the bottom of the first casing to the receiving opening of the fan casing, and means to rotate the cylinder and the fan.

3. In a sheller, the combination with a shelling concave, of a shelling cylinder mounted to rotate therein, a cylindrical casing surrounding the concave and open at the bottom beneath it, a suction-fan casing above the first casing, a fan in said casing, a third casing generally cylindrical in its outline surrounding the first casing and mounted eccentrically thereto so that the air passage between the two cylindrical casings increases from the bottom to the top, and means to rotate the cylinder and fan.

4. In a sheller, the combination with a shelling concave, of a shelling cylinder mounted to rotate therein, a casing surrounding the concave and open at the bottom beneath it, a suction-fan casing, a fan in said casing, a third casing surrounding the first and also open at the bottom and forming an air passage from the bottom of the first casing to the receiving opening of the fan casing, a screen between the openings in the bottom of the first and third casings, and means to rotate the cylinder and fan.

5. In a sheller, the combination with a shelling concave, of a shelling cylinder mounted to rotate therein, a casing surrounding the concave and open at the bottom beneath it, a suction-fan casing, a fan in said casing, a third casing surrounding the first and also open at the bottom and forming an air passage from the bottom of the first casing to the receiving opening of the fan casing, a shaking screen between the openings in the bottom of the first and third casings, and means to rotate the cylinder and fan and to reciprocate the screen.

6. In a sheller, the combination with shelling mechanism, of a suction fan rotating in the casing above the shelling mechanism, a casing surrounding the shelling mechanism and open at the bottom beneath it, a second casing surrounding the last-mentioned casing and also open at the bottom, the two last-mentioned casings forming an air passage from between their adjacent openings to the suction-fan casing, a coarse screen interposed between the openings in the bottoms of the two casings, a fine screen beneath the opening in the outside casing, an inclined imperforate plate beneath the second screen, and a third screen beneath the imperforate plate, substantially as and for the purpose described.

7. In a sheller, the combination with shelling mechanism, of a corn screen beneath the shelling mechanism upon which the shelled corn is discharged, an inclined imperforate plate beneath the screen having distributing ribs on its upper surface, a finer screen plate beneath the imperforate plate, a conveyer trough into which the finer screen plate discharges, and means for driving the shelling mechanism and shaking the screens.

8. In a sheller, the combination with a shelling concave having a cob-discharge opening at one end thereof, of a shelling cylinder therein, a casing surrounding the concave having an opening at its bottom through which the shelled grain passes, a suction-fan casing above the first casing, a fan in said casing, a cob screen upon which they are discharged from the concave, a hood extending over the cob screen, a passage from the hood to the fan casing for the husks, and means to rotate said fan and shelling cylinder.

9. In a sheller, the combination with a shelling concave having a cob discharge opening at one end thereof, of a shelling cylinder therein, a casing surrounding the concave having an opening at its bottom through which the shelled corn passes, a shelled-corn screen directly beneath the concave, a transversely-extending cob-screen beyond the end of the concave and above the corn screen, and means for rotating the cylinder and shaking the screens.

10. In a sheller, the combination with a shelling concave having a cob discharge opening at one end thereof, of a shelling cylinder therein, a casing surrounding the concave having an opening at its bottom through which the shelled grain passes, a screen frame extending beneath the concave and beyond it at its discharging end, a shelled-corn screen carried by the frame directly beneath the concave, a transversely-extending cob-screen carried by the frame beyond the end of the concave and above the plane of the corn screen, and means for rotating the cylinder and shaking the screen-frame.

11. In a corn-sheller, the combination with shelling mechanism having a cob-discharging opening at one end thereof, of a casing surrounding the shelling mechanism having an opening at its bottom through which the shelled grain passes, a corn-screen below the concave, and an inclined cob-screen beneath the cob-discharging opening in the concave, a transversely extending bar on the top of the cob-screen toward the discharge end thereof, said bar being shaped effectively to prevent shelled corn passing it, but permitting the cobs to roll over it, and means to carry shelled corn falling through the cob-screen onto the corn-screen.

12. In a sheller, the combination with a horizontal shelling shaft extending longitudinally of the center of the machine, a shelling cylinder on the shaft, and a shelling concave with which it coöperates, of a vertical shaft journaled in one end of the machine, gearing between the two shafts, a longitudinally-movable shaking screen suspended beneath the concave, driving connections between the vertical shaft and the screen for shaking the latter as the shaft rotates, a suction-fan casing above the concave, a fan mounted on a vertical shaft in the fan-casing, gearing connecting the two vertical shafts, a worm conveyer beneath the screen into which the corn passing through the screen is delivered, a shelled-corn elevator at the discharge end of the sheller into which the worm conveyer discharges and by which it is driven, and gearing connecting the horizontal shaft and the elevator driving mechanism.

13. In a sheller, the combination with a horizontal shelling shaft extending longitudinally of the center of the machine, a shelling cylinder on the shaft, and a shelling concave with which it coöperates, of a vertical shaft journaled in one end of the machine, gearing between the two shafts, a longitudinally-movable shaking screen suspended beneath the concave, driving connections between the vertical shaft and the screen for shaking the latter as the shaft rotates, a suction-fan casing above the concave, a fan mounted on a vertical shaft in the fan-casing, gearing connecting the two vertical shafts, a cob-conveying chute at the discharge end of the concave, a cob elevator pivoted to the sheller beneath the cob-conveying chute, and gearing connecting the bottom of the first vertical shaft with the cob elevator.

14. In a sheller, the combination with a shelling concave, of a shelling cylinder mounted to rotate therein, a casing surrounding the concave and open at the bottom beneath it, a suction fan casing associated with the first mentioned casing, a fan in said casing, a third casing surrounding the first and also open at the bottom and connected by an air passage with the receiving opening of the fan casing, and means to rotate the cylinder and fan.

15. In a sheller, the combination with a shelling concave, of a shelling cylinder mounted to rotate therein, a casing surrounding the concave and open at the bottom beneath it, a suction fan casing, a fan in said casing, a third casing surrounding the first and also open at the bottom and connected by an air passage with the receiving opening of the fan casing, a screen between the openings in the bottom of the first and third casings, and means to rotate the cylinder and fan.

16. In a corn-sheller, the combination with a horizontal concave, of a shelling cylinder coöperating therewith, a horizontal driving shaft extending through the machine upon which the cylinder is secured, a vertical shaft at the discharge end of the machine, a shaking screen beneath the concave, operating connections between the shaking screen and the vertical shaft, a worm conveyer extending the length of the machine beneath the screen and into which the grain going through the screen falls, a shelled-corn elevator at the discharge end of the machine into which the worm conveyer discharges and driving the worm conveyer, gearing between the horizontal shaft and the shelled-corn elevator for operating the latter, a cob-screen chute extending transversely of the grain-screen at the discharge end and discharging from the side of that end of the machine, a cob elevator into which the cob-screen chute discharges, and gearing from the vertical shaft to the cob elevator.

17. In a corn-sheller, the combination with a horizontal concave, of a shelling cylinder coöperating therewith, a horizontal driving shaft extending through the machine upon which the cylinder is secured, a vertical shaft at the discharge end of the machine, a shaking screen beneath the concave, operating connections between the shaking screen and the vertical shaft, a worm conveyer extending the length of the machine beneath the screen and into which the grain going through the screen falls, a shelled-corn elevator at the discharge end of the machine into which the worm conveyer discharges and driving the worm conveyer, a feeding elevator at the other end of the machine discharging into the receiving end of the concave, gearing connected to the horizontal shaft driving both of the elevators, a cob-screen chute extending transversely of the grain-screen at the discharge end and discharging from the side of that end of the machine, a cob-elevator into which the cob-screen chute discharges, and gearing from the vertical shaft to the cob elevator.

18. In a sheller, the combination with a horizontal shelling shaft extending longitudinally of the center of the machine, a shelling cylinder on the shaft, and a shelling concave with which it coöperates, of a vertical shaft journaled in one end of the machine, gearing connecting the two shafts, a longitudinally-movable shaking screen suspended beneath the concave, driving connections between the vertical shaft and the screen for shaking the latter as the shaft rotates, a suction-fan casing above the concave, a fan mounted on a vertical shaft in the fan-casing, pulleys on the upper ends of the two vertical shafts, a belt connecting the two pulleys, a worm conveyer beneath the screen into which the corn passing through the screen is delivered, a shelled-corn elevator at the discharge end of the sheller into which the worm conveyer discharges and by which it is driven, a sprocket wheel on the horizontal shaft, a second sprocket wheel on the top of the framework, a sprocket chain connecting the sprocket wheels, a third sprocket wheel secured to rotate with the second sprocket wheel, a sprocket wheel on the uppermost shaft of the shelled-corn elevator, and a sprocket chain connecting the last-mentioned sprocket wheels.

19. In a sheller, the combination with a horizontal shelling shaft extending longitudinally of the center of the machine, a shelling cylinder on the shaft, and a shelling concave with which it coöperates, of a vertical shaft journaled in one end of the machine, gearing connecting the two shafts, a longitudinally-movable shaking screen suspended beneath the concave, driving connections between the vertical shaft and the screen for shaking the latter as the shaft rotates, a suction-fan casing above the concave, a fan mounted on a vertical shaft in the fan-casing, pulleys on the upper ends of the two vertical shafts, a belt connecting the two pulleys, a cob-conveying chute at the discharge end of the concave, a cob elevator pivoted to the sheller-frame beneath the cob-conveying chute, a sprocket wheel secured on the lower end of the vertical shaft, a sprocket wheel loosely journaled on a vertical shaft depending from the bottom of the cob elevator, a sprocket chain connecting the last-mentioned sprocket wheels, a beveled gear rotating with the last-mentioned sprocket wheel, a bevel gear meshing with the first-mentioned bevel gear and secured on the lower shaft of the cob elevator.

20. In a sheller, the combination with a horizontal shelling shaft extending longitudinally of the center of the machine, a shelling cylinder on the shaft, and a shelling concave with which it coöperates, of a vertical shaft journaled in one end of the machine, gearing connecting the two shafts, a longitudinally-movable shaking screen suspended beneath the concave, driving connections between the vertical shaft and the screen for shaking the latter as the shaft rotates, a suction-fan casing above the concave, a fan mounted on a vertical shaft in the fan-casing, pulley-wheels on the upper ends of the two shafts, a belt connecting the two pulley-wheels, a worm conveyer beneath the screen into which the corn passing therethrough is delivered, a shelled-corn elevator at the discharge end of the sheller into which the worm conveyer discharges and by which it is driven, a sprocket wheel on the horizontal shaft, a countershaft above said horizontal shaft, a sprocket wheel on the countershaft, a sprocket chain connecting the two sprocket wheels, a sprocket pinion on the countershaft, a sprocket wheel on the driving shaft of the shelled-corn elevator, a sprocket chain connecting the last-mentioned sprocket pinion and sprocket wheel, a cob-conveying chute at the discharge end of the concave, a cob elevator pivoted to the sheller-frame on a vertical shaft beneath the cob-conveying chute, a sprocket wheel connected to the lower end of the main vertical shaft, a sprocket wheel journaled on the pivot of the cob elevator, a sprocket chain connecting the last-mentioned sprocket wheel and pinion, a miter gear rigidly connected to the last-mentioned sprocket wheel, a companion miter gear meshing therewith, and a driving shaft for the conveying mechanism journaled in the cob-conveyer and having the last-mentioned miter gear secured thereto.

21. In a sheller, the combination with a horizontal shelling shaft extending longitudinally of the center of the machine, a shelling cylinder on the shaft, and a shelling concave with which it coöperates, of a vertical shaft journaled in one end of the machine, gearing connecting the two shafts, a longitudinally-movable shaking screen suspended beneath the concave, driving connections between the vertical shaft and the screen for shaking the latter as the shaft rotates, a suction-fan casing above the concave, a fan mounted on a vertical shaft in the fan-casing, pulley wheels on the upper ends of the two shafts, a belt connecting the two pulley wheels, a worm conveyer beneath the screen into which the corn passing therethrough is delivered, a shelled-corn elevator at the discharge end of the sheller into which the worm conveyer discharges and by which it is driven, a sprocket wheel on the horizontal shaft, a countershaft above said horizontal shaft, a sprocket wheel on the countershaft, a sprocket chain connecting the two sprocket wheels, a sprocket pinion on the countershaft, a sprocket wheel on the driving shaft of the shelled-corn elevator, a sprocket chain connecting the last-mentioned sprocket pinion and sprocket wheel, a feeding elevator discharging into the concave, a miter gear on the countershaft, a horizontal shaft extending transversely across the top of the machine, a miter gear on said shaft meshing with the last-mentioned miter gear, a sprocket pinion on the transverse shaft, a sprocket wheel on the driving shaft of the feeding elevator, and a sprocket chain connecting the last-mentioned sprocket wheel and pinion.

22. In a sheller, the combination with a horizontal shelling shaft extending longitudinally of the center of the machine, a shelling cylinder on the shaft, and a shelling concave with which it coöperates, of a vertical shaft journaled in one end of the machine, gearing connecting the two shafts, a longitudinally-movable shaking screen suspended beneath the concave, driving connections between the vertical shaft and the screen for shaking the latter as the shaft rotates, a suction-fan casing above the concave, a fan mounted on a vertical shaft in the fan-casing, pulley wheels on the upper ends of the two shafts, a belt connecting the two pulley wheels, a worm conveyer beneath the screen into which the corn passing therethrough is delivered, a shelled-corn elevator at the discharge end of the sheller into which the worm conveyer discharges and by which it is driven, a sprocket wheel on the horizontal shaft, a countershaft above said horizontal shaft, a sprocket wheel on the countershaft, a sprocket chain connecting the two sprocket wheels, a sprocket pinion on the countershaft, a sprocket wheel on the driving shaft of the shelled-corn elevator, a sprocket chain connecting the last-mentioned sprocket pinion and sprocket wheel, a feeding elevator discharging into the concave, a miter gear on the countershaft, a horizontal shaft extending transversely across the top of the machine, a miter gear on said shaft meshing with the last-mentioned miter gear, a sprocket pinion on the transverse shaft, a sprocket wheel on the driving shaft of the feeding elevator, a sprocket chain connecting the last-mentioned sprocket wheel and pinion, a cob-conveying chute at the discharge end of the concave, a cob elevator pivoted by a vertical bearing to the sheller-frame beneath the cob-conveying chute, a sprocket wheel journaled on the lower end of said vertical bearing, a sprocket pinion on the lower end of the main vertical shaft, a chain connecting the last-mentioned sprocket wheel and pinion, a miter gear secured on the hub of the last-mentioned sprocket wheel, and a miter gear meshing therewith secured on the main driving shaft of the cob-conveying chute.

23. In a corn sheller, the combination with a horizontal concave, of a shelling cylinder coöperating therewith, a horizontal driving shaft extending through the machine, upon which the cylinder is secured, a vertical shaft at the discharge end of the machine, gearing connecting said shafts, a shaking screen beneath the concave, operating connection between the shaking screen and the vertical shaft, a worm conveyer extending the length of the machine beneath the screen and into which the grain going through the screen falls, a shelled-corn elevator at the discharge end of the machine into which the worm conveyer discharges, a sprocket wheel in the boot of the elevator secured on the end of the worm-conveyer shaft, a sprocket pinion on the main horizontal shaft, a countershaft on the top of the machine, a sprocket wheel on said countershaft, a sprocket chain connecting said sprocket wheel and pinion, a driving shaft in the top of the elevator, a sprocket wheel thereon inside of the elevator, a chain connecting the two sprocket wheels in the elevator, cups carried by the chain, a sprocket wheel on the main shaft of the elevator outside of the casing, a sprocket pinion on the countershaft, and a sprocket chain connecting the last-mentioned sprocket wheel and the sprocket pinion on the countershaft.

24. In a corn-sheller, the combination with a horizontal concave, of a shelling cylinder coöperating therewith, a horizontal driving shaft extending through the machine, upon which the cylinder is secured, a vertical shaft at the discharge end of the machine, gearing connecting said shafts, a shaking screen beneath the concave, operating connections between the shaking screen and the vertical shaft, a worm conveyer extending the length of the machine beneath the screen and into which the grain going through the screen falls, a shelled-corn elevator at the discharge end of the machine into which the worm conveyer discharges, a sprocket wheel in the boot of the elevator secured on the end of the worm-conveyer shaft, a sprocket pinion on the main horizontal shaft, a countershaft on the top of the machine, a sprocket wheel on said countershaft, a sprocket chain connecting said sprocket wheel and pinion, a driving shaft in the top of the elevator, a sprocket wheel thereon inside of the elevator, a chain connecting the two sprocket wheels in the elevator, cups carried by the chain, a sprocket wheel on the main shaft of the elevator outside of the casing, a sprocket pinion on the countershaft, a sprocket chain connecting the last-mentioned sprocket wheel and the sprocket pinion on the countershaft, a feeding elevator at the other end of the machine discharging into the receiving end of the concave, a miter gear on the countershaft, a transverse shaft across the top of the machine, a miter gear on said transverse shaft meshing with the other miter gear, a sprocket pinion on the transverse shaft on the opposite side of the machine from the miter gears, a sprocket wheel on the main shaft of the feeding elevator, and a sprocket chain connecting the last-mentioned sprocket wheel and pinion.

25. In a corn-sheller, the combination with a horizontal concave, of a shelling cylinder coöperating therewith, a horizontal driving shaft extending through the machine, upon which the cylinder is secured, a vertical shaft at the discharge end of the machine, gearing connecting said shafts, a shaking screen beneath the concave, operating connections between the shaking screen and the vertical shaft, a worm conveyer extending the length of the machine beneath the screen and into which the grain going through the screen falls, a shelled-corn elevator at the discharge end of the machine into which the worm conveyer discharges, a sprocket wheel in the boot of the elevator secured on the end of the worm-conveyer shaft, a sprocket pinion on the main horizontal shaft, a countershaft on the top of the machine, a sprocket wheel on said countershaft, a sprocket chain connecting said sprocket wheel and pinion, a driving shaft in the top of the elevator, a sprocket wheel thereon inside of the elevator, a chain connecting the two sprocket wheels in the elevator, cups carried by the chain, a sprocket wheel on the main shaft of the elevator outside of the casing, a sprocket pinion on the countershaft, a sprocket chain connecting the last-mentioned sprocket wheel and the sprocket pinion on the countershaft, a feeding elevator at the other end of the machine discharging into the receiving end of the concave, a miter gear on the countershaft, a transverse shaft across the top of the machine, a miter gear on said transverse shaft meshing with the other miter gear, a sprocket pinion on the transverse shaft on the opposite side of the machine from the miter gears, a sprocket wheel on the main shaft of the feeding elevator, a sprocket chain connecting the last-mentioned sprocket wheel and pinion, a cob-screen chute extending transversely of the grain screen at the discharge end and discharging from the side of that end of the machine, a cob elevator into which the cob-screen chute discharges pivotally mounted on a vertical bearing at the bottom of the side of the machine, a sprocket wheel journaled on said vertical bearing, a sprocket pinion on the bottom of the main vertical shaft, a sprocket chain connecting the last-mentioned sprocket wheel and pinion, a miter gear secured to the hub of the cob-elevator sprocket-wheel, and a miter gear meshing therewith secured on the main shaft of the cob-elevator.

26. In a corn-sheller, the combination with a horizontal concave, of a shelling cylinder coöperating therewith, a horizontal driving shaft extending through the machine, upon which the cylinder is secured, a vertical shaft at the discharge end of the machine, bevel gearing connecting the horizontal shaft and the vertical shaft, a shaking screen beneath the concave, an eccentric on the vertical shaft, an eccentric strap connecting said eccentric and the shaking screen, a worm conveyer extending the length of the machine beneath the screen and into which the grain going therethrough falls, a shelled-corn conveyer at the discharge end of the machine into which the worm conveyer discharges, a sprocket wheel secured on the end of the worm-conveyer shaft inside of the shelled-corn elevator, a sprocket pinion on the main horizontal shaft, a countershaft journaled on the top of the machine, a sprocket wheel secured on said countershaft, a sprocket chain connecting the last-mentioned sprocket pinion and sprocket wheel, a driving shaft for the shelled-corn elevator in the top of the casing, a sprocket wheel on said shaft inside of the casing, a sprocket chain connecting the two sprocket wheels in the elevator casing, cups carried by the sprocket chain, a sprocket pinion on the countershaft, a sprocket wheel on the elevator driving shaft outside of the casing, a sprocket chain connecting the last-mentioned sprocket wheel and pinion, a cob-screen chute extending transversely of the grain screen at the discharge end and discharging from the side of that end of the machine, a cob elevator into which the cob-screen chute discharges journaled on a vertical bearing at that side of the end of the machine, a sprocket wheel journaled on the lower end of said vertical bearing, a sprocket pinion on the lower end of the main vertical shaft, a sprocket chain connecting the last-mentioned sprocket wheel and pinion, a miter gear secured on the cob-elevator sprocket-wheel, and a miter gear meshing with the main shaft of the cob elevator.

In witness whereof, we have hereunto set our hands and affixed our seals, this 26 day of February, A. D. 1916.

JOHN H. GILMAN. [L. S.]
ALBERT E. GILMAN. [L. S.]

Witnesses:
  EMIL G. HASSLEY,
  ED. R. CLAUS.